(12) United States Patent
Walthert et al.

(10) Patent No.: US 9,421,817 B2
(45) Date of Patent: Aug. 23, 2016

(54) WHEEL FOR AT LEAST PARTIALLY MUSCLE-POWERED VEHICLES AND IN PARTICULAR BICYCLES

(71) Applicant: DT SWISS INC., Grand Junction, CO (US)

(72) Inventors: Martin Walthert, Aarberg (CH); Stefan Spahr, Lengnau (CH)

(73) Assignee: DT SWISS INC., Grand Junction, CO (US)

(*) Notice: Subject to any disclaimer, the term of this patent is extended or adjusted under 35 U.S.C. 154(b) by 13 days.

(21) Appl. No.: 14/182,782

(22) Filed: Feb. 18, 2014

(65) Prior Publication Data

US 2014/0239703 A1    Aug. 28, 2014

(30) Foreign Application Priority Data

Feb. 22, 2013   (DE) .......................... 10 2013 002 968

(51) Int. Cl.
*B60B 1/00* (2006.01)
*B60B 1/04* (2006.01)
*B60B 21/06* (2006.01)
*B60B 1/02* (2006.01)
*B60B 21/02* (2006.01)

(52) U.S. Cl.
CPC ................. *B60B 1/003* (2013.01); *B60B 1/041* (2013.01); *B60B 1/044* (2013.01); *B60B 21/062* (2013.01); *B60B 1/0215* (2013.01); *B60B 1/048* (2013.01); *B60B 21/025* (2013.01); *B60B 21/066* (2013.01)

(58) Field of Classification Search
CPC ........ B06B 1/003; B06B 1/041; B06B 1/043; B06B 1/044; B06B 1/045; B06B 21/06; B06B 21/062; B06B 21/064
See application file for complete search history.

(56) References Cited

U.S. PATENT DOCUMENTS

| 5,499,864 | A | * | 3/1996 | Klein | B60B 21/062 301/58 |
| 5,788,607 | A | * | 8/1998 | Baker | A61H 1/0285 482/4 |
| 6,145,937 | A | * | 11/2000 | Chen | B60B 21/062 301/58 |
| 6,386,831 | B1 | * | 5/2002 | Stahl | F04D 29/281 29/889.21 |
| 7,281,892 | B2 | * | 10/2007 | Lejars | F01D 17/162 415/160 |
| 8,113,593 | B2 | | 2/2012 | Spahr et al. | |
| 2007/0063575 | A1 | * | 3/2007 | Passarotto | B60B 1/041 301/58 |
| 2008/0054709 | A1 | * | 3/2008 | Spahr | B60B 1/0215 301/58 |
| 2011/0273000 | A1 | * | 11/2011 | Hall | B60B 5/02 301/95.101 |
| 2012/0212038 | A1 | * | 8/2012 | Watarai | B60B 21/066 301/95.101 |
| 2012/0301286 | A1 | * | 11/2012 | Boletis | B23P 6/005 415/200 |

FOREIGN PATENT DOCUMENTS

WO       2005/023563       3/2005

* cited by examiner

*Primary Examiner* — John Walters
*Assistant Examiner* — James Triggs
(74) *Attorney, Agent, or Firm* — Greer, Burns & Crain, Ltd.

(57) ABSTRACT

A wheel for at least partially muscle-powered vehicles and two-wheeled vehicles includes a hub and a rim having a plurality of spoke holes and a plurality of spoke systems for connecting the hub with the rim. A spoke system includes a spoke and a spoke nipple. A reinforcing unit with a through hole between the rim and the spoke nipple is provided. The reinforcing unit is a disk-type and is configured curved about at least one longitudinal axis. The reinforcing unit has a convex inner rim contact surface for bearing against a concave orientation area of the rim matched thereto. The reinforcing unit has a concave outside surface at which a nipple accommodation is provided at a depression having a concave nipple contact surface with a narrower curvature for accommodating a matching, convex supporting area of the spoke nipple.

15 Claims, 4 Drawing Sheets

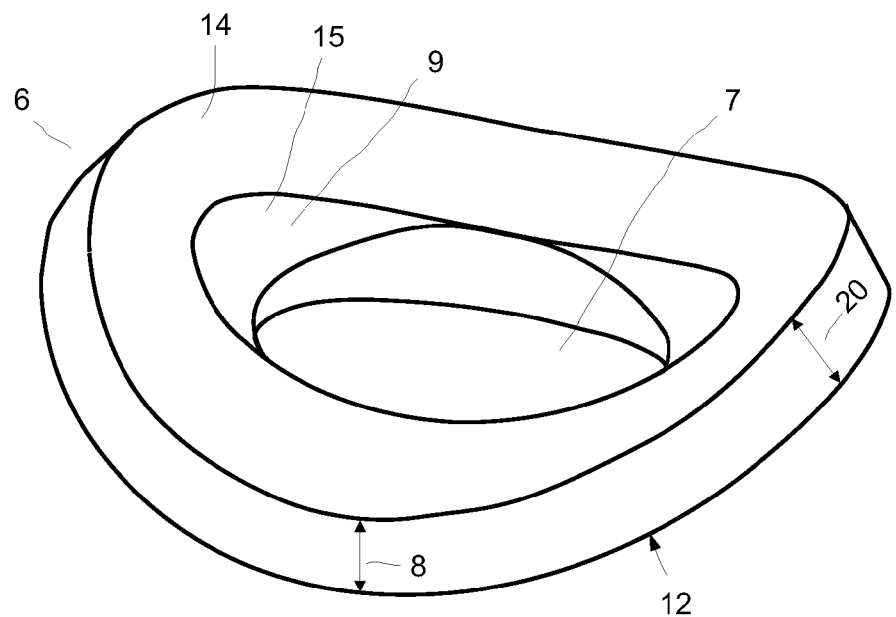
Fig. 4
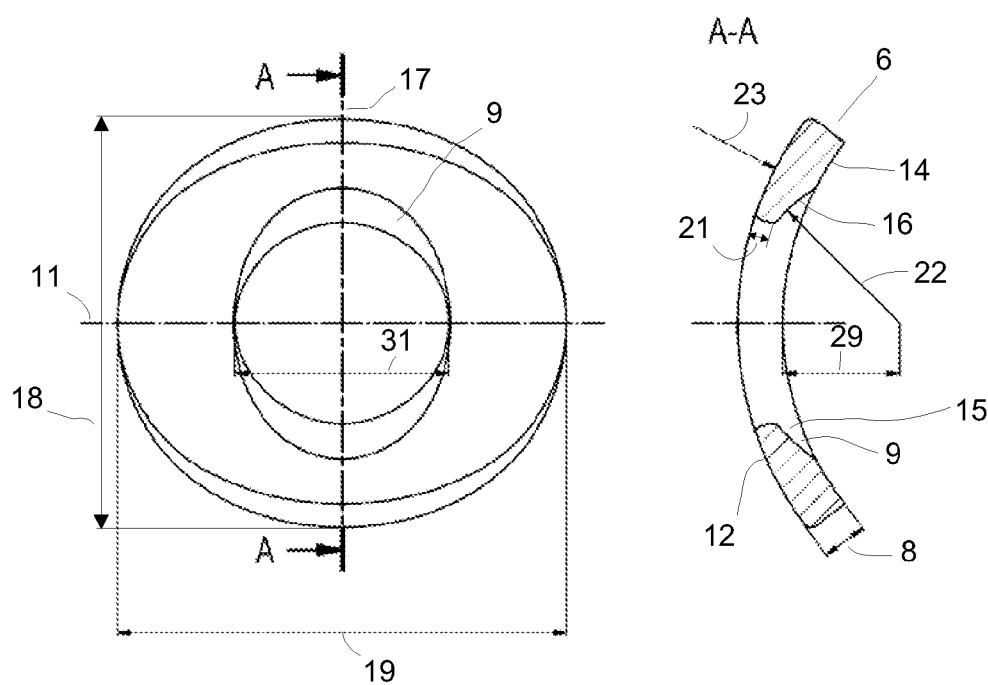
Fig. 5                              Fig. 6

WHEEL FOR AT LEAST PARTIALLY MUSCLE-POWERED VEHICLES AND IN PARTICULAR BICYCLES

BACKGROUND

The present invention relates to a wheel for at least partially muscle-powered vehicles and in particular for bicycles.

Many different types of bicycle wheels have become known in the prior art. Hollow rims tend to be used with the spoke nipples disposed in the region of the hollow space between the rim base and the rim well. For reinforcing the rim base, rim eyelets may be employed which, as shown e.g. in FIG. 6 of EP 0 715 001 B1, connect the rim well and the rim base in the radial direction. The rim eyelets reinforce among other things the rim base.

US 2003/0090141 A1 discloses a wheel for bicycles where a cylindrical spacer sleeve is inserted between the rim base and the spoke nipple in the region of the rim hollow so as to ease the spoke at the transition between its threaded portion for screw-fastening to the spoke nipple and the non-threaded spoke portion. The bearing surface of the spoke nipple at the cylindrical spacer sleeve may be spherical so as to allow angular orientation of the spoke. To ensure the function the US 2003/0090141 A1 requires the cylindrical spacer sleeve to be of such a height as to result in a spoke bend in the region of the wheel radius. A height of 5 mm has been found to be advantageous for the cylindrical spacer sleeve. This wheel shows the drawback that the region of the rim hollow must be designed very high in the radial direction to accommodate the cylindrical spacer sleeve and the spoke nipple.

For reducing the total weight of a wheel having a metal rim, EP 0 715 001 B1 shows in FIG. 8 a rim which had been subjected to chemical post-processing for reducing rim material in such a way as to retain reinforced areas at the spoke holes only.

U.S. Pat. No. 6,402,256 B1 describes as an alternative, mechanical post-processing of the rim wall thickness such that in the spoke hole areas the rim wall thickness is greater than in other areas. This also allows a reduced weight of the rim.

While a rim according to U.S. Pat. No. 6,402,256 B1 and also the rim according to EP 0 715 001 B1 can be manufactured lightweight and functional, manufacturing involves complicated steps, thus making the rims expensive.

SUMMARY

It is therefore the object of the present invention to provide a wheel in particular for a bicycle that allows a reduced weight and high stability with reduced manufacturing work. This wheel comprises a rim, a hub and a plurality of spoke systems connecting the rim with the hub. Each of the spoke systems comprises a spoke and a spoke nipple. At least one spoke system comprises a reinforcing unit with a through hole. The wheel may be configured as a rear wheel or else as a front wheel.

A wheel according to the invention for at least partially muscle-powered vehicles and in particular two-wheeled vehicles comprises a hub and a rim having a plurality of spoke holes and a plurality of spoke systems for connecting the hub with the rim. A spoke system comprises at least a spoke and a spoke nipple. At least one reinforcing unit is provided with a through hole and is provided or disposed between the rim and the spoke nipple. The reinforcing unit is a disk-type and is configured curved about at least one longitudinal axis. The reinforcing unit comprises a convex inner rim contact surface for bearing against a matched, concave orientation area of the rim. The reinforcing unit comprises a concave outside surface. The outside surface is provided with a nipple accommodation at a depression having a concave nipple contact surface with a narrower curvature. The nipple accommodation with the narrower, concave nipple contact surface serves to accommodate a matching, convex supporting area for the spoke nipple.

The wheel according to the invention has many advantages since it allows the cost effective manufacture of a wheel showing high stability and a low total weight. A low total weight can be obtained due to the reinforcing unit that is only configured as a disk-type since because of its disk structure it shows a small volume and thus a low weight. The disk structure does not require any shoulders or appendices for positioning or fixing the reinforcing unit.

The curved configuration of the reinforcing unit around at least one longitudinal axis and its convex, i.e. outwardly curved rim contact surface, provides preferred matching to the concave area, i.e. the inwardly curved area of the rim. A desired force transition from the spoke nipple through the reinforcing unit to the rim base is enabled. Preferably the reinforcing unit is not required to deform first. The structure of the reinforcing unit is preferably directly matched to the structure of the rim. Thus the reinforcing unit fits substantially snugly to the rim when it is inserted into the rim.

Another advantage is that the reinforcing unit can orient itself to the rim since the contours are matched. The contour is in particular approximated to circle segments such that contact over the surface will be retained even if the reinforcing unit is slightly displaced.

It is furthermore advantageous that no separate orientation contour or holder of the reinforcing unit to the rim well is required. The reinforcing unit does not require a specific orienting aid but it is preferably self-orienting during assembly.

A considerable advantage is achieved by the concave outside surface with the nipple accommodation provided thereat having a concave nipple contact surface with a narrower curvature. The spoke nipple accommodated at the nipple accommodation can orient itself relative to the reinforcing unit. The convex supporting area of the spoke nipple can orient itself relative to the concave nipple contact surface. Moreover, the supporting surface of the nipple on the reinforcing unit is preferably enlarged so as to considerably reduce the surface pressure.

Thus, two separate orienting options independent from one another are provided. The reinforcing unit can orient itself relative to the rim, and the spoke nipple can orient itself relative to the reinforcing unit. On the whole a preferred orientation with desired force transmission is enabled so as to achieve lightweight, firm wheels.

Preferably the reinforcing unit has a thickness that is less than the maximum diameter of the spoke and in particular less than the maximum diameter of the spoke shaft. Thus the reinforcing unit occupies just a small volume so as to generate a low weight even if steel is used as the material for the reinforcing unit such that on the whole a particularly lightweight wheel can be manufactured.

The disk-type structure of the reinforcing unit and the contact surface matched to the rim allow a desired transition of forces so that the wall thickness of the rim can be complementarily dimensioned.

The rims used are preferably of metal and are manufactured from an extruded profile. The rim blank used is then a piece of the extruded profile that basically shows consistent wall thicknesses over its length in every place of the cross section. This means that each cross section is identical, apart from the spoke holes.

This means that a slight reduction of the rim wall thickness in the area of the rim base already considerably reduces the weight of the entire rim, since said wall thickness is reduced accordingly over the entire circumference. Moreover, the wheel mass distanced from the axle is reduced. This reduces the moment of inertia of the wheel which improves the wheel dynamics.

Now, due to the reinforcing units the wall thickness is increased precisely in those positions which require a higher strength. At the same time the reinforcing units are preferably made of a high-strength material such as steel, while the rim blank or body per se preferably consists of a light metal or a light metal alloy. This results in a lightweight and stable wheel that is easy to manufacture.

The wall thickness of the rim, in particular in the region of the rim base, can be reduced compared to conventional wall thicknesses. The wall thickness may be reduced by 10% and even 20% or more.

The wheel according to the invention includes simple components which can be manufactured at low cost while also offering considerable saving of weight. No complicated molds or chip-producing or chemical finishing work to the rim, the spoke nipples or the reinforcing unit are required.

Although the requirement of saving weight has existed for quite some time, the solutions disclosed thus far have been considerably more complicated and moreover show a higher weight.

Preferably the thickness of the reinforcing unit varies less than 25% over the entire reinforcing unit, other than a tapered down, central nipple accommodation.

The depression comprising the nipple accommodation may be milled out. The depression may be configured by squashing. The depression may be embossed or forged.

In preferred configurations, the spoke nipples protrude radially inwardly through the spoke holes in the rim.

In advantageous specific embodiments, the quantity of spoke nipples differs from the quantity of reinforcing units. This means that the reinforcing units are disposed at a fraction of the spoke nipples only. The quantity of spoke nipples may in particular be larger than the quantity of reinforcing units. It is possible for reinforcing units to be provided at a few individual spokes only. For example spokes subjected to lower loads may be provided without reinforcing units.

It is possible to provide no reinforcing units or thinner or lighter reinforcing units for specific and e.g. radially oriented spokes. Spokes subjected to higher loads which may e.g. be oriented tangentially may be provided with stronger or larger reinforcing units. Then, the rim is reinforced locally in dependence on the loads occurring.

Preferably at least one spoke hole is provided without a reinforcing unit. Preferably at least one spoke hole is provided with the spoke nipple resting on the edge of the spoke hole.

In all the configurations, it is possible for different and in particular at least two different reinforcing units to be provided which differ in at least one dimension and/or in the material. It is possible for at least two reinforcing units to differ in their size, length, width, and/or thickness.

Preferably the rim substantially consists of an extruded profile in particular of at least one light metal. Preferably the concave nipple contact surface having a narrower curve extends at least in one direction transverse to the longitudinal axis. In the mounted state the longitudinal axis is in particular oriented along the rim circumference so that the narrower curve of the concave nipple contact surface extends in parallel or at least approximately in parallel to an axis of symmetry of the rim and/or of the wheel. This allows an angular orientation of a spoke relative to a righthand or lefthand end and thus e.g. relative to both the hub flanges of a corresponding hub. Then the spoke does not require bending but it can extend in a straight line between the rim and the hub so as to increase durability and stressability.

A thickness of at least one reinforcing unit is in particular less than one fourth of the width and in particular less than one fourth of the length of the reinforcing unit. The reinforcing unit is particularly preferably configured oval or round and is between approximately 7 mm and 14 mm in length and/or width. In preferred configurations, a maximum dimension of the reinforcing unit is less than twice the maximum diameter of the spoke nipple.

In preferred configurations, at least one reinforcing unit has a maximum thickness of less than 2.0 mm and preferably less than 1.5 mm and in particular less than 1.0 mm. This allows a particularly thin and thus lightweight reinforcing unit which thus contributes to a considerable weight reduction of the entire wheel. A major factor is the disk-type structure having a low thickness. A thin and flat reinforcing unit improves mountability since in the case of a hollow rim it can be inserted more readily into the hollow through the hole in the rim well.

In the case that different reinforcing units are provided, they may differ e.g. in their thickness and or in their length and width. For example, the reinforcing units provided may be thicker by 25% or 50% in positions subjected to higher loads. It is also possible for the supporting surfaces of the reinforcing units to differ by 25% or 50%. Combined variations of the supporting surface and the thickness are likewise possible.

At least one reinforcing unit consists and in particular all the reinforcing units consist preferably of metal and in particular of steel. The rim preferably consists at least partially of metal and/or at least one fibrous composite material.

A minimum thickness of the reinforcing unit at the nipple accommodation is preferably between one third and two thirds of a maximum thickness of the reinforcing unit. A minimum thickness of the reinforcing unit is preferably at least 0.2 mm. Too thin wall thicknesses can compromise the reproducibility of the functions. However, the minimum wall thickness also depends on the material used and it may be less in the case of particularly stable materials.

Preferably the concave nipple contact surface of the central nipple accommodation has a radius of curvature that is less than half the radius of curvature of the concave outside surface of the reinforcing unit. Thus, at the reinforcing unit that is curved on the whole, a nipple accommodation is defined that is provided as a recess within the material of the disk-type reinforcing unit. This means that the curvature of the nipple contact surface is configured greater than the curvature of the concave outside surface on the whole. The nipple accommodation may, for example, be configured as a spherical seat whose radius is larger than the radius of the through hole.

Preferably the center of the nipple accommodation is disposed at such a distance from the reinforcing unit that a circumferential segment in the region of the nipple accommodation lies substantially entirely within the disk structure of the reinforcing unit.

In all the configurations, it is preferred for a radius of curvature of the concave nipple contact surface of the reinforcing unit to be between 2 mm and 4 mm. Preferably, a radius of curvature of the convex, inner rim contact surface of the reinforcing unit and/or a radius of curvature of the concave outside surface of the reinforcing unit is between 4 mm and 20 mm.

The rim is preferably configured as a hollow rim, being between 15 and 40 mm in width and in particular between 16 and 38 mm and preferably between 17 mm and 36 mm.

A height of the hollow rim is in particular at least 18 mm and preferably at least 20 mm. The height may be up to 100 mm. It is preferred though for the height to be in the range between approximately 20 and 40 mm.

The spoke nipple preferably has a spherical head and at least one tool engagement point, e.g. a Torx or an internal hexagon, an external hexagon, and/or a square. The tool engagement point in particular projects at least partially inwardly through the spoke hole.

BRIEF DESCRIPTION OF THE DRAWINGS

Further advantages and features of the present invention can be taken from the description of the exemplary embodiment which will be discussed below with reference to the enclosed figures.

The figures show in:

FIG. 4 a perspective illustration of the reinforcing unit of the wheel according to FIG. 3;

FIG. 5 a top view of the reinforcing unit according to FIG. 3;

FIG. 6 a cross-section of the reinforcing unit according to FIG. 5;

DETAILED DESCRIPTION

With reference to the enclosed FIGS. 1 to 9, an exemplary embodiment of a wheel 1 according to the invention will be discussed by way of its use in bicycles 100.

Figure 1:
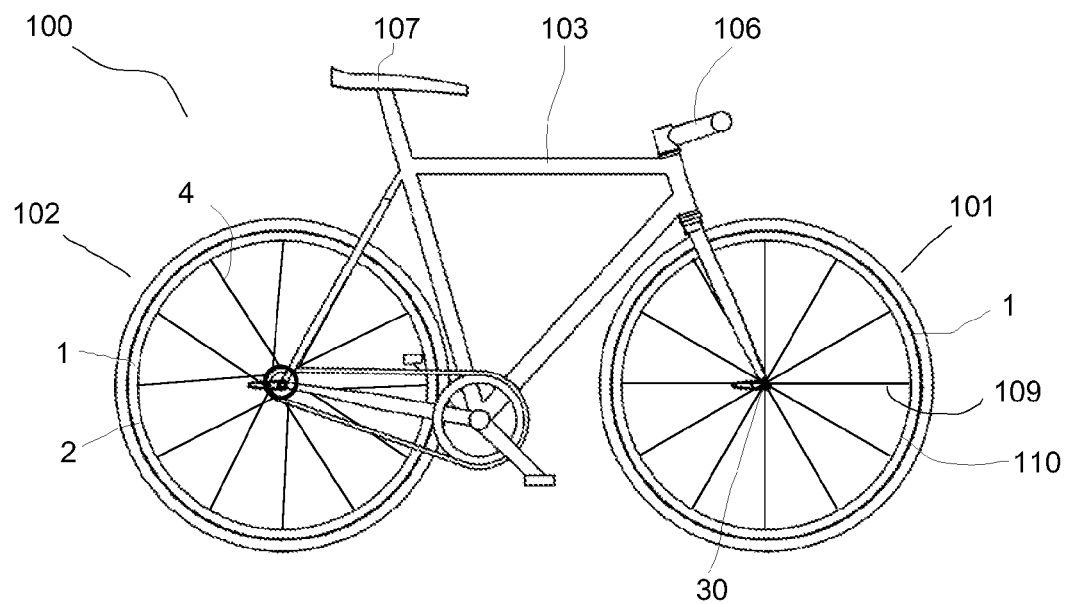
FIG. 1 a simplistic view of a bicycle equipped with wheels according to the invention.

FIG. 1 shows a bicycle 100 illustrated as a roadster or a racing bicycle with the front wheel 101 and the rear wheel 102 configured as wheels 1 according to the invention. The bicycle comprises a frame 103, a handlebar 106 and a saddle 107. The front wheel 101 and the rear wheel 102 are each provided with a plurality of spoke systems 3. The rim 2 is connected with the hub 30 by means of spokes 4. The front wheel 101 is presently provided with radial spoking while the rear wheel 102 is provided with spokes disposed at least in part tangentially at the hub 30 to allow the transmission of rotational force.

Figure 2:
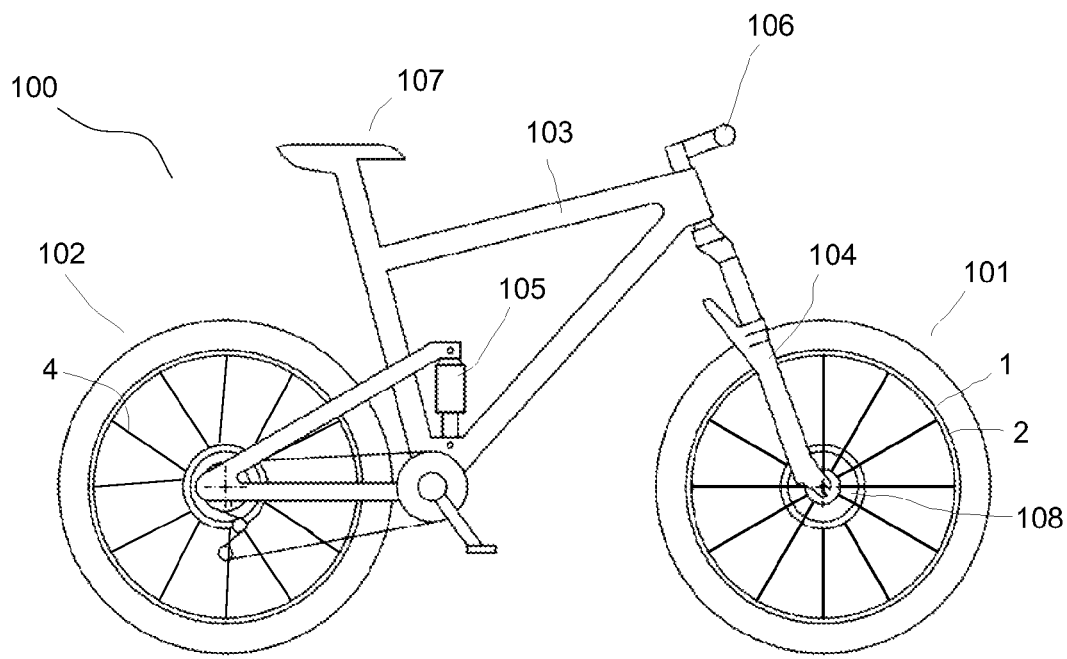
FIG. 2 a simplistic view of another bicycle equipped with wheels according to the invention.

FIG. 2 shows a schematic illustration of a mountainbike as the bicycle 100. The front wheel is retained sprung at a suspension fork 104 while a damper 105 is provided for damping the rear wheel. A disk brake 108 serves for braking.

Figure 3:
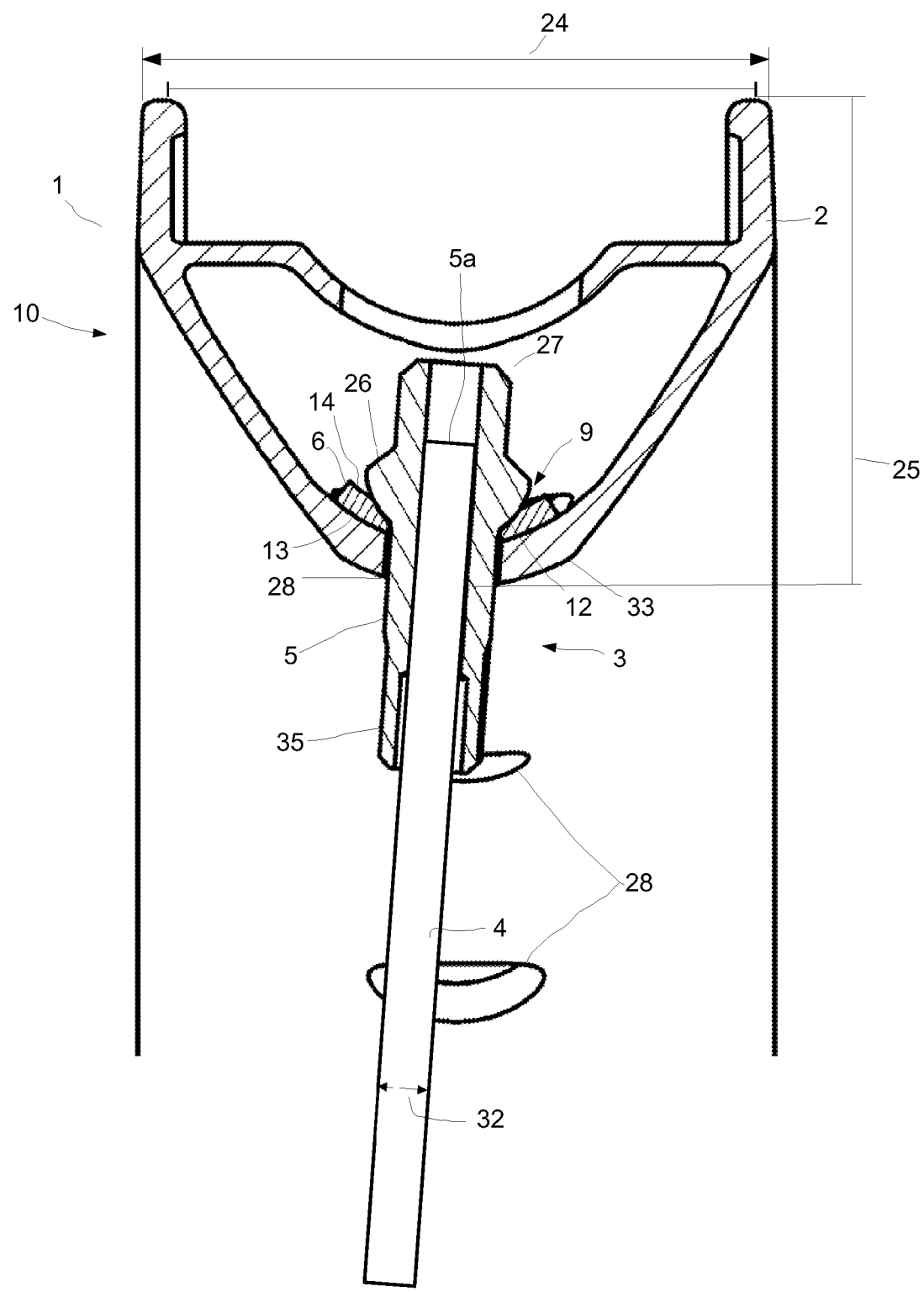
FIG. 3 a cross-section of a wheel according to the invention.

FIG. 3 shows an enlarged cross-section of a wheel 1 according to the invention having a rim 2 and a spoke system 3 in the assembled state 10.

In the hollow space area of the rim 2, the concave rim base 13 is provided with a disk-type reinforcing unit 6 having a convex rim contact surface 12 and a concave outside surface 14. The convex rim contact surface 12 is matched to the concave rim base 13 so as to allow on the one hand an optimum force transition from the reinforcing unit 6 to the rim base and on the other hand also an angular orientation of the reinforcing unit 6 relative to the rim base 33. This ensures a particularly good angular orientation of the spoke 4 to the rim well 33.

The spoke system 3 comprises a spoke nipple 5 and the spoke 4. The spoke 4 comprises in an end region thereof an external thread that screws into an internal thread at the spoke nipple 5. The radially outwardly end of the spoke nipple 5 is provided with a tool engagement point 27 where a tool can engage for rotating the spoke nipple 5 and tensioning the spoke 4. The spoke nipple 5 may, for example, comprise a Torx drive or else an internal hexagon or an external hexagon. Other tool engagement points are likewise possible.

The spoke nipple 5 comprises a spherical head 26 with its hemispherical-type surface accommodated at a depression 15 having a concave nipple contact surface 16. The hemispherical-type surface of the spherical head 26 forms a supporting area 5a at which the spoke nipple 5 rests on the concave nipple contact surface 16. The concave nipple contact surface 16 in combination with the convex surface or the convex supporting area 5a of the spoke nipple 5 also allows an angular orientation of the spoke system 3. The effective length of the spoke 4 does not change even in the case of an angular orientation.

The spoke nipple 5 plunges through a through hole 7 in the reinforcing unit 6 and through a spoke hole 28 in the rim 2 through the rim 2 so as to make the spoke nipple 5 project radially inwardly. This allows a compact rim with a hollow space of a height that may e.g. be low.

The inward end of the spoke nipple 5 is provided with a square 35 which a tool can engage for example for tensioning or readjusting a spoke system 3. This considerably facilitates the performance of maintenance. While the system according to US 2003/0090141 A1 provides for first removing the tire to allow access to the interior of the rim, the spoke 4 in the present case can be tensioned at the square 35 or a tool contour.

While in the present exemplary embodiment the width 24 of the rim 2 is preferably between approximately 20 and 25 mm, it may basically be between 17 and 36 mm. The height 25 of the rim 2 from the rim well up to the rim flanges is presently somewhat over 20 mm and it may be noticeably larger depending on the configuration.

It can clearly be seen in FIG. 3 that the thickness 8 of the reinforcing unit 6 is in all the places less than the diameter 32 of the spoke 4. In the case of double thickness spokes, the thickness of the reinforcing unit 6 may be smaller than that of the thinner part of the spoke 4.

The thickness 8 of the reinforcing unit 6 and the thickness of the rim base 33 are matched to one another such that a particularly low total weight can be achieved overall. This is decisively also achieved by the fact that the reinforcing unit 6 is configured as a disk-type and does not extend into the spoke hole 28 of the rim 2. The reinforcing unit 6 has a thickness 8 that is small enough so as to contribute to the total weight of the wheel 1 to a minor extent only.

FIG. 4 shows a schematic, perspective illustration of a reinforcing unit 6, clearly showing the bent, disk-type structure with the through hole 7. The reinforcing unit 6 has a thickness 8 that, apart from the central nipple accommodation 9, is presently constant and corresponds to the maximum thickness 20 of the reinforcing unit 6. The thickness 8 in the present exemplary embodiment is approximately 0.9 mm and may be somewhat thinner or thicker depending on the embodiment and the application. In particular, the thickness 8 of the reinforcing unit 6 is thinner than a maximum diameter of a spoke 4 of the associated spoke system 3 and in particular also thinner than the rim base 33 on which the reinforcing unit 6 rests. The reinforcing unit 6 may be referred to as a reinforcing disk. Places subjected to particular loads may be provided with a thicker and/or larger reinforcing unit 6 having a thickness and/or supporting surface enlarged e.g. by 10%, 25% or else 50%. In places subject to low loads the reinforcing unit 6 may be omitted or a thinner and/or smaller reinforcing unit 6 may be employed having a thickness and/or supporting surface that is reduced by e.g. 5%, 10% or else 25%.

The reinforcing unit 6 shows a convex rim contact surface 12 which in the state 10 installed as intended bears against the rim base 33. The outside surface 14 of the reinforcing unit 6 is preferably oriented in parallel or at least approximately in parallel to the rim contact surface 12. A through hole 7 is centrally disposed at the reinforcing unit 6 and provided to be surrounded by the nipple accommodation 9. The nipple accommodation 9 is configured as a concave depression 15 on the outside surface 14 and comprises a concave nipple contact surface 16. The nipple contact surface 16 shows a radius of curvature 22 that is clearly smaller than the radius of curvature 23 of the rim contact surface 12 or the outside surface 14.

FIG. 5 shows a top view of the reinforcing unit 6 from FIGS. 3 and 4. The reinforcing unit 6 is mirror-symmetrical and curved along a longitudinal axis 11. The depression 15 of the nipple accommodation 9 is configured transverse to the longitudinal axis 4 along a direction 17.

The reinforcing unit 6 has a length 19 in the peripheral direction of the rim 2 and a width 18 transverse thereto. The reinforcing unit 6 may be manufactured from an originally circular, flat disk. The reinforcing unit 6 shows a central through hole 7 having a diameter 31 that is slightly larger than is the outer diameter of the spoke nipple 5 that passes through in the assembled state 10 to also allow an angular orientation of the spoke 4 relative to the reinforcing unit 6.

On the whole the spoke system offers two options for angular orientation. The reinforcing unit 6 may be angularly oriented relative to the rim 2. Moreover an orientation of the angle of the spoke 4 by the reinforcing unit 6 is possible.

FIG. 6 shows a cross-section along the lines A-A from FIG. 5. The reinforcing unit 6 shows at the rim contact surface 12 and at the outside surface 14 a curve each having a radius of curvature 23. The radius of curvature 23 depends on the specific application and in the exemplary embodiment lies in a range between approximately 6 mm and 8 mm. The nipple accommodation 9 shows a narrower curve of the nipple contact surface 16 having a radius of curvature 22 that is noticeably smaller than the radius of curvature 23. In the exemplary embodiment, the radius of curvature 22 is between approximately 2.5 mm and 4 mm and preferably it is not larger than half the radius of curvature 23.

A maximum thickness 8 of the illustrated reinforcing unit 6 is presently approximately 0.9 mm. The minimum thickness 21 of the reinforcing unit 6 lies in a range of one third and two thirds of the maximum thickness 8 and is presently approximately 0.4 mm. Other reinforcing units 6 may be larger or smaller and thicker or thinner.

The distance 22 from the center of the nipple contact surface 16 is presently chosen such that the circle segment having the nipple contact surface 16 extends entirely within the outer contour of the reinforcing unit 6. This means that the distance 29 plus the thickness 8 of the reinforcing unit 6 is larger than or the same size as is the radius of curvature 22.

The fact that the spoke nipple 5 projects radially inwardly out of the rim 2 and the fact that the thin, disk-type structure is matched to the rim curvature, allow to provide a particularly lightweight wheel 1 that is still robust. Since both the reinforcing unit 6 and the spoke nipple 5 can orient themselves angularly, a wheel 1 may be provided that withstands large and also highly dynamic loads while having a low weight.

Figure 7:
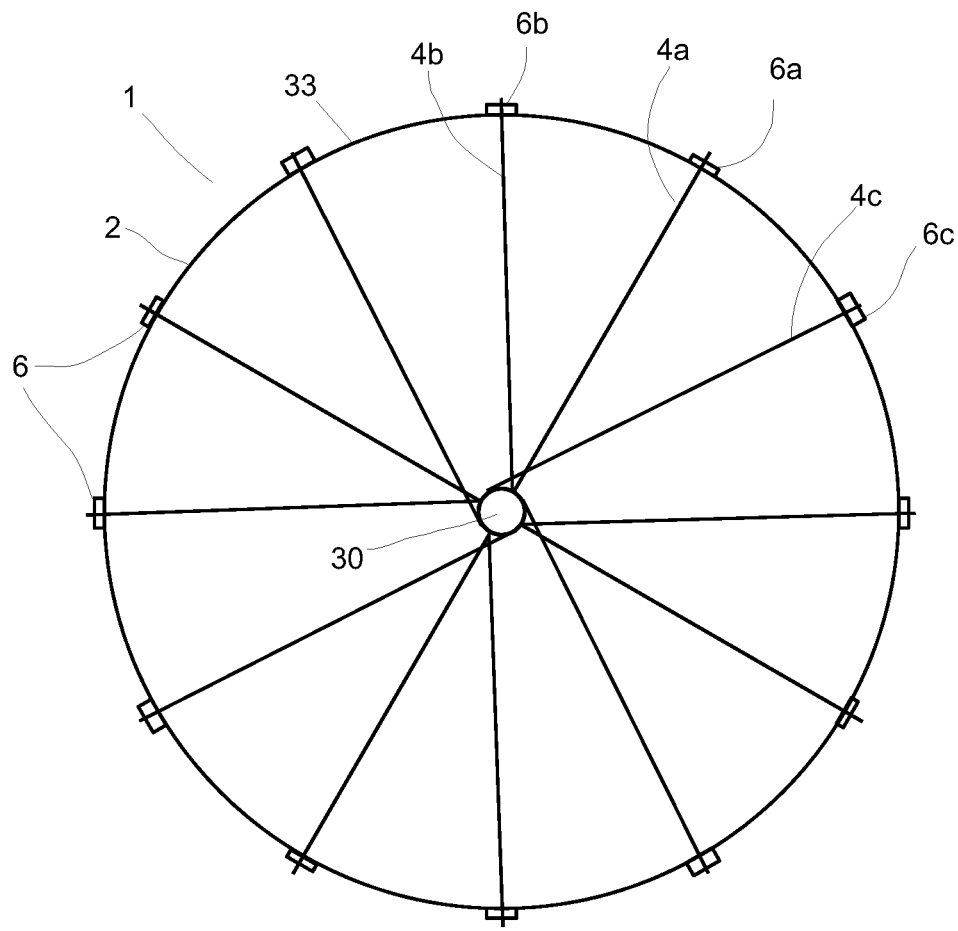
FIG. 7 a simplistic side view of a wheel according to the invention.

FIG. 7 shows a simplistic side view of a wheel 1 provided with both radially oriented spokes 4a, very slightly tangentially oriented spokes 4b, and somewhat more tangentially oriented spokes 4c. Due to the spokes 4b and 4c oriented also with a tangential component, the transmission of rotational forces in accelerating and decelerating is better.

The rim base 33 shown schematically only is provided with different reinforcing units 6a through 6c for the different spokes 4a through 4c. The reinforcing units 6a through 6c differ from one another in at least one property and in particular in at least one dimension.

Preferably, the rim contact surface 12 of the reinforcing units 6a to 6c is configured in various sizes as a supporting surface on the concave rim base 33 so as to provide the spokes 4b, 4c subjected to higher loads with a larger surface for the transition of forces. It is also preferred for the thicknesses 8a, 8b and 8c of the reinforcing units 6a to 6c to differ from one another. Preferably the thicknesses 8b, 8c of the spokes 4b, 4c are greater than is the thickness 8a of the reinforcing unit 6a.

It is also possible to provide the spokes subjected to little load such as e.g. the spoke 4a with no reinforcing unit 6a at all so that the spoke nipple rests immediately on the spoke hole 28 in the rim 2. Then the quantity of spoke nipples 5 of the wheel 1 is higher than the quantity of reinforcing units 6.

In all the configurations, a reinforcing unit 6 is provided for exactly one spoke nipple. This allows weight savings compared to reinforcing elements which retain and support two and more spoke nipples at one reinforcing element. These reinforcing elements retaining two and more spoke nipples need to be configured clearly larger and stronger so that their weight is considerably higher.

Figure 8:
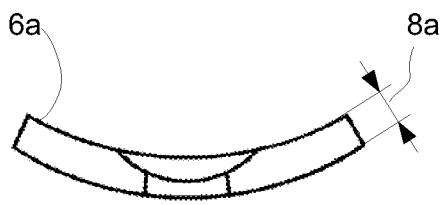
FIG. 8 a cross-section of a reinforcing unit.
Figure 9:
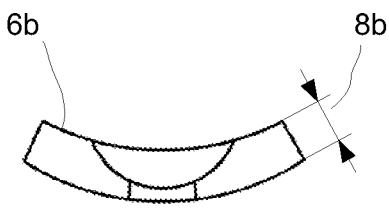
FIG. 9 a cross-section of another reinforcing unit.

FIGS. 8 and 9 show two variations of reinforcing units 6a and 6b which differ in their dimensions. The reinforcing unit 6a is configured thinner and the reinforcing unit 6b is thicker. In both cases the maximum thickness is presently less than 2 mm and more than 0.5 mm each.

Variable configurations of the reinforcing units 6 allow for achieving a desired total weight of the wheel 1. The rim wall thickness may be significantly reduced. In some or in several places e.g. in solely radially oriented spokes or in spokes subjected to low loads reinforcing units 6 may be dispensed with entirely.

The invention claimed is:

1. A wheel for at least partially muscle-powered vehicles and in particular two-wheeled vehicles comprising:
   a hub and a rim having a plurality of spoke holes and a plurality of spoke systems for connecting the hub with the rim;
   a spoke system comprises at least one spoke and a spoke nipple;
   at least one reinforcing unit is provided with a through hole between at least one spoke nipple and the rim;
   the reinforcing unit is a disk type and is configured curved about at least one longitudinal axis and comprises a convex inner rim contact surface for resting on a concave orientation area of the rim matched thereto, and
   the reinforcing unit comprises a concave outside surface at which a nipple accommodation is provided at a depression having a concave nipple contact surface with a corresponding curvature to accommodate a matched, convex supporting area of the spoke nipple, wherein the concave outside surface of the nipple accommodation has a radius of curvature that is less than half the radius of curvature of the concave outside surface of the reinforcing unit.

2. The wheel according to claim 1 wherein the thickness of the at least one reinforcing unit, apart from the nipple accommodation, varies over the entire reinforcing unit by less than 25%.

3. The wheel according to claim 1 wherein a maximum thickness of the at least one reinforcing unit is smaller than a maximum diameter of a spoke.

4. The wheel according to claim 1 wherein the spoke nipple projects radially inwardly through a spoke hole in the rim.

5. The wheel according to claim 1, further comprising a plurality of reinforcing units, wherein a quantity of the spoke nipples is greater than a quantity of the reinforcing unit units such that the at least one of the reinforcing units is provided between a corresponding one of the reinforcing units and the rim.

6. The wheel according to claim 1 wherein different reinforcing units are provided which differ in at least one of a dimension and a material.

7. The wheel according to claim 1 wherein the rim substantially consists of an extruded profile.

8. The wheel according to claim 1 wherein the concave nipple contact surface extends in a direction transverse to the longitudinal axis.

9. The wheel according to claim 1 wherein a thickness of the at least one reinforcing unit is smaller than one fourth of the width and smaller than one fourth of the length of the at least one reinforcing unit.

10. The wheel according to claim 1 wherein the at least one reinforcing unit has a maximum thickness of less than 1.5 mm and a minimum thickness of at least 0.2 mm.

11. The wheel according to claim 1 wherein a minimum thickness of the reinforcing unit at the nipple accommodation is between $1/3$ and $2/3$ of a maximum thickness of the reinforcing unit.

12. The wheel according to claim 1 wherein at least one of a length and a width of the reinforcing unit is between 7 mm and 14 mm.

13. The wheel according to claim 1 wherein at least one of: a radius of curvature of the concave nipple contact surface of the reinforcing unit is between 2 mm and 4 mm, and a radius of curvature of the convex inner rim contact surface of the reinforcing unit or a radius of curvature of the concave outside surface of the reinforcing unit is between 4 mm and 20 mm.

14. The wheel according to claim 1 wherein the rim is configured as a hollow rim and has a width between 16 mm and 38 mm and a height of at least 18 mm.

15. The wheel according to claim 1 wherein the spoke nipple has a spherical head and at least one tool engagement point projecting inwardly through the spoke hole.

\* \* \* \* \*